(12) United States Patent
Stachowski

(10) Patent No.: US 12,060,843 B2
(45) Date of Patent: Aug. 13, 2024

(54) POWER-NEUTRAL EXHAUST GAS TEMPERATURE REDUCTION USING AN EXHAUST GAS TURBINE BYPASS

(71) Applicant: Bayerische Motoren Werke Aktiengesellschaft, Munich (DE)

(72) Inventor: Sebastian Stachowski, Hettenshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/272,266

(22) PCT Filed: Dec. 15, 2021

(86) PCT No.: PCT/EP2021/085884
§ 371 (c)(1),
(2) Date: Jul. 13, 2023

(87) PCT Pub. No.: WO2022/161693
PCT Pub. Date: Aug. 4, 2022

(65) Prior Publication Data
US 2024/0077040 A1 Mar. 7, 2024

(30) Foreign Application Priority Data
Feb. 1, 2021 (DE) ...................... 10 2021 102 180.4

(51) Int. Cl.
*F02D 41/00* (2006.01)
*F02D 41/02* (2006.01)
*F02D 41/14* (2006.01)

(52) U.S. Cl.
CPC ..... *F02D 41/0007* (2013.01); *F02D 41/1446* (2013.01); *F02D 2041/0265* (2013.01); *F02D 2200/0802* (2013.01)

(58) Field of Classification Search
CPC ................. F02B 37/18–186; F02D 2200/0802
See application file for complete search history.

(56) References Cited

U.S. PATENT DOCUMENTS

| 6,314,735 B1 | 11/2001 | Kolmanovsky et al. |
| 8,371,108 B2 | 2/2013 | Chyo |
| (Continued) | | |

FOREIGN PATENT DOCUMENTS

| DE | 10 2010 063 444 A1 | 6/2011 |
| DE | 10 2018 207 915 A1 | 11/2018 |

OTHER PUBLICATIONS

International Search Report (PCT/ISA/210) issued in PCT Application No. PCT/EP2021/085884 dated Apr. 20, 2022 with English translation (5 pages).

(Continued)

*Primary Examiner* — Ngoc T Nguyen
(74) *Attorney, Agent, or Firm* — Crowell & Moring LLP

(57) ABSTRACT

A method for controlling an internal combustion engine having an exhaust gas turbocharger and an exhaust gas aftertreatment device, includes determining a catalytic converter temperature, comparing the determined catalytic converter temperature with an upper temperature threshold, and, if the comparison determines that the threshold has been exceeded, reducing a proportion of the exhaust gases of the internal combustion engine which are guided through a turbine bypass of the exhaust gas turbocharger.

20 Claims, 3 Drawing Sheets

(56) References Cited

U.S. PATENT DOCUMENTS

| | | |
|---|---|---|
| 11,454,163 B1* | 9/2022 | Plagens ................ F01N 13/107 |
| 2005/0060999 A1 | 3/2005 | Mulloy et al. |
| 2011/0146269 A1 | 6/2011 | Hepburn et al. |
| 2012/0029749 A1 | 2/2012 | Ulrey et al. |
| 2018/0334978 A1 | 11/2018 | Kitaura et al. |
| 2021/0262401 A1* | 8/2021 | Hu .......................... F02N 19/00 |

OTHER PUBLICATIONS

German-language Written Opinion (PCT/ISA/237) issued in PCT Application No. PCT/EP2021/085884 dated Apr. 20, 2022 (6 pages).
German-language Search Report issued in German Application No. 10 2021 102 180.4 dated Jul. 23, 2021 with partial English translation (13 pages).
German-language Office Action issued in German Application No. 10 2021 102 180.4 dated Oct. 19, 2021 (seven (7) pages).

* cited by examiner

POWER-NEUTRAL EXHAUST GAS TEMPERATURE REDUCTION USING AN EXHAUST GAS TURBINE BYPASS

FIELD

The invention relates to a method for controlling an internal combustion engine having an exhaust-gas turbocharging arrangement and having an exhaust-gas aftertreatment device, to a controller for carrying out the method, and to a vehicle drive having a controller of said type.

BACKGROUND AND SUMMARY

Ever more stringent requirements with regard to exhaust-gas aftertreatment systems and emissions regulations mean that known measures for protecting the exhaust-gas aftertreatment systems by reducing or maintaining a temperature are not sufficient if disadvantages with regard to engine power and/or fuel consumption in high-load operation are not to be accepted at the same time. The requirements with regard to the service life or durability of the exhaust-gas aftertreatment system are also becoming more stringent.

Known measures for lowering the temperature of exhaust-gas aftertreatment systems are for example an enrichment of the air-fuel mixture that is burned, or the Miller/Atkinson combustion cycle.

The principle of enrichment will become ever less prevalent in future, in particular owing to legal or other normative directives, because sufficient enrichment will no longer be allowed.

Under demanding boundary conditions of vehicle operation, in particular in full-load operation, the Miller/Atkinson combustion cycle furthermore reaches its system limits, and in such cases can no longer be used for lowering the exhaust-gas temperature for the exhaust-gas aftertreatment systems.

It would therefore then be necessary, for example, to reduce/throttle the power of the internal combustion engine in order to maintain the temperature level in the exhaust-gas section or reduce said temperature level to the required extent. Such interventions are however undesired because they are difficult to communicate to the user.

Against this background, it is an object of the invention to improve an actuation of the internal combustion engine and of the components of the vehicle drive, in particular to influence such an actuation when it is necessary to influence a temperature of an exhaust-gas aftertreatment device.

Said object is achieved by means of a method having the features as disclosed herein, a controller having the features as disclosed herein, and a vehicle drive having the features as disclosed herein. The present disclosure also relates to advantageous refinements of the invention.

According to one aspect, a method for controlling an internal combustion engine, in particular having an exhaust-gas turbocharging arrangement and an exhaust-gas aftertreatment device, is disclosed. The control method has at least the following method steps, which may be carried out in the stated sequence or some other sequence that appears inherently expedient to a person skilled in the art:

(1) Determining, in particular measuring, reading out and/or modelling, a catalytic converter temperature, which is in particular critical for functionality with regard to a service life of the exhaust-gas aftertreatment device.

(2) Comparing the determined catalytic converter temperature with an upper temperature threshold value, above which a failure of the exhaust-gas purification arrangement, and/or an intolerable shortening of the service life of a component of the exhaust-gas purification arrangement, is to be expected.

If an overshooting of the threshold value is identified in the comparison in step (2), the following method steps are additionally carried out:

(III) Reducing a fraction of the exhaust gases of the internal combustion engine that are guided through a turbine bypass of the exhaust-gas turbocharger of the internal combustion engine, in particular to the exhaust-gas aftertreatment device directly or more directly, that is to say with a smaller loss of enthalpy, than if the corresponding exhaust-gas fraction were guided through the turbine.

(IV) Reducing a supply of fresh air to the cylinders of the internal combustion engine.

By virtue of a smaller fraction of the hot exhaust gases being guided directly to the exhaust-gas aftertreatment device, a lowering of the temperature of the, possibly reunified, exhaust-gas flow at the exhaust-gas aftertreatment device can be achieved, because a greater fraction is guided via the turbine. This is because the enthalpy loss of the exhaust gases, and the associated lowering of the temperature, is more pronounced in the turbine than if the exhaust gas were guided through the turbine bypass.

However, owing to the increased impingement of flow on the turbine, which exceeds the impingement of flow actually required for the respective operating state of the internal combustion engine, the charge pressure in the cylinders increases, leading to an undesired increase in power in the combustion.

Through the reduction of the supply of fresh air, which in one embodiment may be achieved by way of a smaller degree of opening of a throttle flap, the undesired increase in power resulting from the increased charge pressure can be compensated or avoided without the need for Miller/Atkinson operation with reduced valve lift. This is advantageous in particular if, owing to the further development of modern internal combustion engines for motor vehicles that is required from the aspect of emissions regulations, a reduced valve lift is kinematically no longer possible, in particular at the camshaft, above certain engine speed limits.

The method steps of (III) reducing a fraction of the exhaust gases of the internal combustion engine that are guided through a turbine bypass of the exhaust-gas turbocharger and (IV) reducing a supply of fresh air to the cylinders of the internal combustion engine are collectively referred to here in particular as "the interventions into the fluid flow line" of the internal combustion engine. The expression "the interventions" thus refers in particular to interventions that functionally serve at least primarily for carrying out a method according to the invention.

According to a further aspect, a controller is disclosed which is in particular implemented on an engine control unit of the internal combustion engine and which is configured to carry out a method according to an embodiment of the invention.

According to a further aspect, a vehicle drive is disclosed. The vehicle drive has at least:
(a) An internal combustion engine, in particular a gasoline or a diesel engine.
(b) An intake system with an air regulating device for the regulated supply of fresh air to the internal combustion engine.
(c) At least one or two exhaust-gas turbochargers, which are in particular connected in series, for supercharging the fresh air for the internal combustion engine, having an exhaust-gas turbine with an exhaust-gas turbine bypass that has a bypass exhaust-gas regulating device.

(d) An exhaust-gas aftertreatment device with a temperature determining device. The exhaust-gas aftertreatment device has at least one three-way catalytic converter, wherein, in particular, the catalytic coating thereof sustains damage, directly or indirectly by way of a shortening of service life, if the exhaust gases that are guided into the catalytic converter are at such a high temperature, and are possibly introduced for such a length of time, that an upper temperature threshold value of the exhaust-gas aftertreatment device is overshot.

(e) A controller according to an embodiment of the invention.

The invention is based inter alia on the consideration that, in modern internal combustion engines for passenger motor vehicles, in a relatively high engine speed range, the inlet valve lift must not be below a minimum level, because component damage otherwise occurs. Since the possibilities for Miller/Atkinson operation are thus greatly limited in this engine speed range, the exhaust-gas temperature upstream of and in the catalytic converter can, with known methods, be held in the non-damaging range only by way of enrichment. This will however be increasingly legally prohibited in future.

The invention is now based inter alia on the concept of allowing a greater mass of exhaust gas to flow via the exhaust-gas turbine of the exhaust-gas turbocharger (in particular in this critical engine speed range) in order that said exhaust-gas turbine thus constitutes a greater temperature sink. By means of the throttle element on the air conduit side, the excess charge pressure that is generated here is regulated down again to the value required for this operating point.

In particular if the exhaust-gas aftertreatment system reaches its system limits, the wastegate is thus closed to a greater degree, in particular to a degree greater than that actually required for this operating state. The resulting increasing charge pressure, which would enable the overall system to generate more power (but which is normally undesired) is curbed, or throttled back to the level actually required for this operating state, by the throttle flap (or some other air regulating device (rotary slide valve or the like)). The power thus remains constant, and the exhaust-gas aftertreatment systems are relieved of load, in terms of their temperature level, by way of the additional dissipation of enthalpy across the turbine. Furthermore, it is thus also possible to achieve general cooling of the exhaust-gas aftertreatment system, which is thus made more durable owing to a reduced introduction of temperature.

In one embodiment, the supply of fresh air is reduced to an extent that is dependent on an extent of the reduction of the fraction of the exhaust gas in the turbine bypass. The compensation level can thus be adapted to the additionally introduced charge pressure.

In one embodiment, the interventions, in particular in accordance with the method, into the guidance of the combustion fluids—air or mixture prior to the combustion, exhaust gases after the combustion—(in particular method step (III): reducing a fraction of the exhaust gases of the internal combustion engine that are conducted through a turbine bypass of the exhaust-gas turbocharger; method step (IV): reducing a supply of fresh air to the cylinders of the internal combustion engine) have the aim of achieving, in particular setting and/or maintaining, a predetermined charge pressure as exactly as possible. In particular, the predetermined charge pressure corresponds to the charge pressure that is intended for the present operating state of the internal combustion engine without disregarding the need for cooling of the exhaust gases.

In one embodiment, the interventions, in particular in accordance with the method, into the guidance of the combustion fluids are ended if a lower temperature threshold value of the catalytic converter temperature is undershot. The range of operating states of the internal combustion engine in which the invention can be used can thus be clearly distinguished.

In one embodiment, the interventions, in particular in accordance with the method, are implemented to a greater degree (that is to say in particular that, in method step III, the wastegate is closed to a greater degree, and in method step IV, the supply of fresh air to the combustion chambers is throttled to a greater degree) the further the upper temperature threshold value is overshot. This allows a continuous and/or constant and/or finely adapted execution of the method.

In one embodiment, the interventions, in particular in accordance with the method, are in particular temporarily implemented to a lesser degree, or not implemented, if and/or for as long as an operating state is present which requires a fast and/or immediate response of the internal combustion engine. In particular, this can be achieved through one-off feedforward control, with no further subsequent readjustment.

In one embodiment, the catalytic converter temperature is determined repeatedly, at short time intervals (in particular of a few milliseconds), and from this a temperature gradient and/or a temperature prediction is determined. A temperature prediction may for example be based on an evaluation of the determined temperature values and of the temperature gradient, such that, in the event of a relatively fast increase in temperature, countermeasures are implemented to a greater degree in the manner according to the invention. In this way, the temperature resistance of the critical components of the exhaust-gas aftertreatment device can be fully utilized without running the risk of an introduction of temperature that is critical with regard to service life being caused as a result of control delays.

For the implementation of the invention, it is not relevant how the catalytic converter temperature is determined. In particular, the catalytic converter temperature may be measured and/or modelled on the basis of an operating model, and/or read out using a lookup table or the like, in particular using the engine control unit.

In one embodiment, the interventions, in particular in accordance with the method, are implemented already before the upper temperature threshold value is reached if, based on a determined temperature gradient and/or a determined temperature prediction, an overshoot is to be expected and/or is no longer avoidable.

This assists the setting of the temperature at the exhaust-gas aftertreatment device in a relatively narrow temperature band, and thus component-conserving operation of the internal combustion engine and of the exhaust-gas aftertreatment device.

In one embodiment, the reduction of the fraction of the exhaust gases of the internal combustion engine that are guided through a turbine bypass of the exhaust-gas turbocharger is performed, in particular indirectly or directly, by way of a reduction of a degree of opening of a bypass exhaust-gas regulating device, for example a bypass valve and/or a bypass slide valve and/or a bypass flap. In this way, the invention can be implemented even without adaptation of hardware to the invention, for example using standard components for guiding air and exhaust gas in internal combustion engines in motor vehicles.

In one embodiment, the reduction of the supply of fresh air to the cylinders of the internal combustion engine is performed, in particular indirectly or directly, by way of a reduction of a degree of opening of an air regulating device, for example a throttle valve and/or a throttle slide valve and/or a throttle flap, of an intake system of the internal combustion engine. In this way, the invention can, in terms of hardware, be implemented using components that are also installed in systems without the invention.

Further advantages and possible uses of the invention will emerge from the following description in conjunction with the figures.

DETAILED DESCRIPTION

Figure 1:
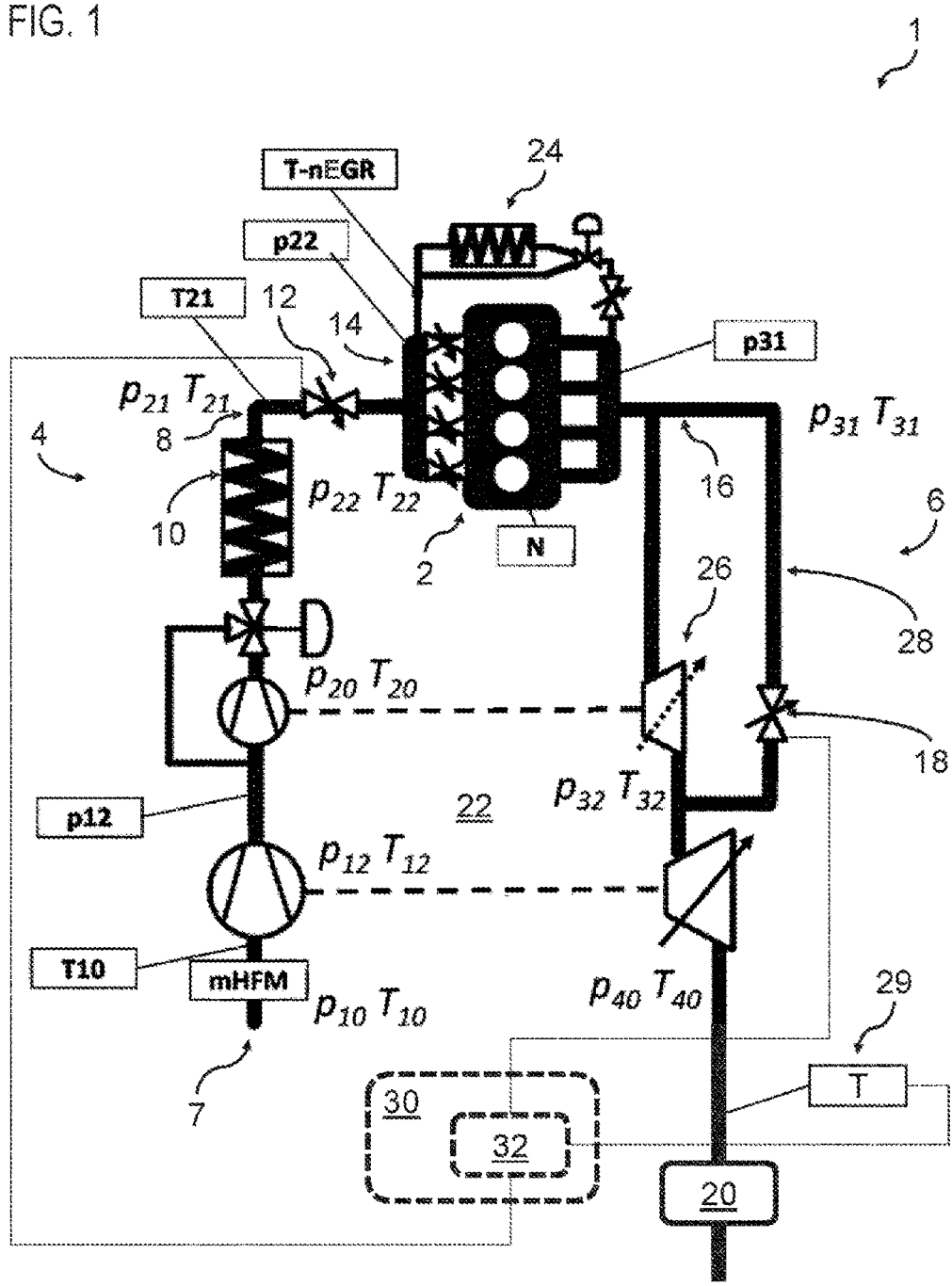
FIG. 1 shows a vehicle drive according to the invention having a controller according to an exemplary embodiment of the invention.

FIG. 1 shows a vehicle drive 1 having an internal combustion engine 2. The internal combustion engine 2 is configured in the exemplary embodiment as a four-cylinder diesel engine. The internal combustion engine 2 is connected to an intake system 4 for a supply of oxygen and to an exhaust-gas system 6 for purification of the exhaust gases.

The intake system 4 has a fresh-air conduit 8, a charge-air cooler 10, an air regulating device 12 configured as a throttle flap, and an air manifold 14.

Along an exhaust-gas conduit 16, the exhaust-gas system 6 has an exhaust manifold and an exhaust-gas aftertreatment device 20 which has at least one three-way catalytic converter, and in particular further aftertreatment devices such as at least one particle filter and/or at least one SCR catalytic converter.

To increase the power of the internal combustion engine 2, a two-stage exhaust-gas turbocharger 22 is arranged in the fresh-air conduit 8 of the intake system 4 and in the exhaust-gas conduit 16 of the exhaust-gas system 6, wherein the compressors of the exhaust-gas turbocharger 22 are arranged in the fresh-air conduit 8 and the turbines of the exhaust-gas turbocharger 22 are arranged in the exhaust-gas conduit 16.

The high-pressure compressor and the high-pressure turbine 26 of the exhaust-gas turbocharger 22 are each configured in the exemplary embodiment such that they can be circumvented by way of a switchable bypass, wherein the exhaust-gas turbine bypass configured as a high-pressure turbine bypass is denoted by the reference designation 28.

The exhaust-gas turbine bypass 28 has a bypass exhaust-gas regulating device 18 which is configured as a flap or valve and by means of which a fraction of the exhaust gases that is guided through the turbine bypass can be adapted in multi-stage or continuously variable fashion.

The intake system 4 and the exhaust-gas system 6 are connectable by means of a switchable high-pressure EGR line 24, such that hot exhaust gas can be guided from the exhaust-gas manifold 17 into the air manifold 14 and mixed there with the fresh air. In the exemplary embodiment, the exhaust gases in the EGR line 24 can be switchably guided through an EGR cooler and/or past same.

A hot film air mass sensor HFM for measuring an air mass flow mHFM, and a temperature sensor for measuring a fresh-air temperature T10, are arranged at a fresh-air inlet 7 of the fresh-air conduit 8. A pressure sensor for measuring a compressor pressure p12 in the fresh-air conduit is arranged between the two compressors 8. A temperature sensor for measuring a pre-throttle temperature T21 in the fresh-air conduit is arranged between the charge-air cooler 10 and the throttle flap 12. A pressure sensor for measuring a charge pressure p22 is arranged in the air manifold 14. A temperature sensor for measuring an EGR mixture temperature T-nEGR at the inlet into the air manifold 14 is arranged in the EGR line 24. A pressure sensor for measuring a pre-turbine pressure p31 is arranged in the exhaust-gas manifold.

A temperature sensor 29 for measuring a catalytic converter temperature T of the exhaust gases before they enter the exhaust-gas aftertreatment arrangement 20 is arranged between the low-pressure turbine of the exhaust-gas turbocharger 22 and the exhaust-gas aftertreatment arrangement 20.

The vehicle drive 1 furthermore has an engine controller 30 that is configured to actuate the vehicle drive 1, and all components thereof, in accordance with the operating requirements of the motor vehicle. For optimum actuation of the vehicle drive and of the components thereof, the engine controller 30 is also configured to take into consideration measured values from all of the abovementioned sensors and to access conventional operation models, lookup tables etc., optionally using the detected and/or processed sensor values.

The engine controller 30 has a controller 32 that is configured to carry out an exemplary method for controlling the internal combustion engine 2. In particular, the controller 32 is configured to determine the catalytic converter temperature T and compare same with a threshold value Tg and, if the threshold value Tg is overshot, to actuate the throttle flap 12 and the bypass exhaust-gas regulating device 18.

To perform these tasks, the engine controller 30 and/or the controller 32 is configured to use operation models 34 of the vehicle, of the vehicle drive and/or of the at least one drive engine such as are typically stored in current motor vehicles, that is to say in particular to use data, sensor values, lookup tables 36 and/or model predictions that can be accessed in said operation models, for the purposes of the present disclosure.

The execution of the exemplary method will be described in detail below on the basis of explanations relating to the illustration of FIG. 2 for a first exemplary method. In FIG. 3, a description will subsequently given as to the manner in which a second example of the method differs from the first according to FIG. 2.

Figure 2:
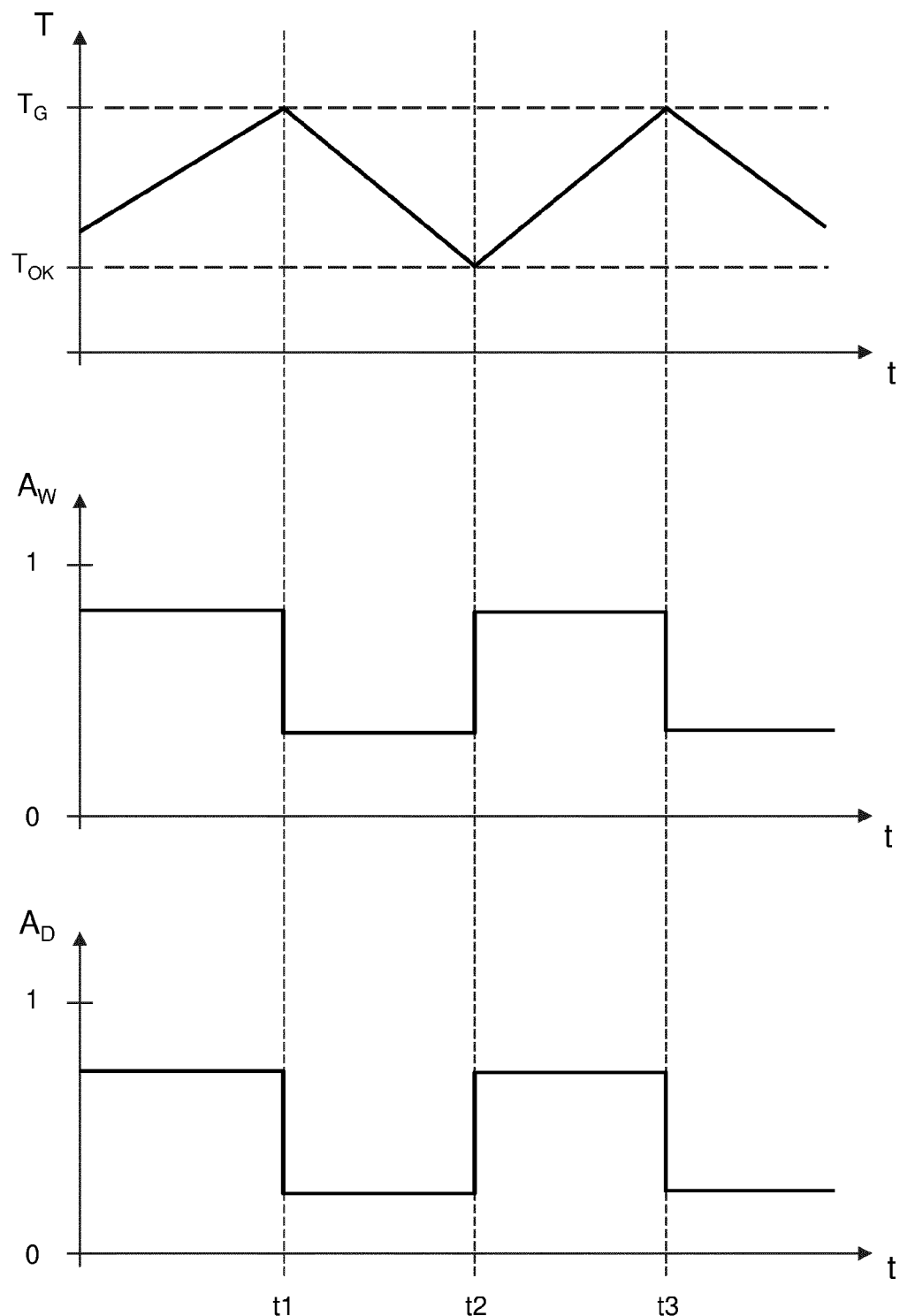
FIG. 2 shows various diagrams, each with a course of different variables with respect to time, for the purposes of illustrating a method according to a first exemplary embodiment, implemented on the vehicle drive from FIG. 1.
Figure 3:
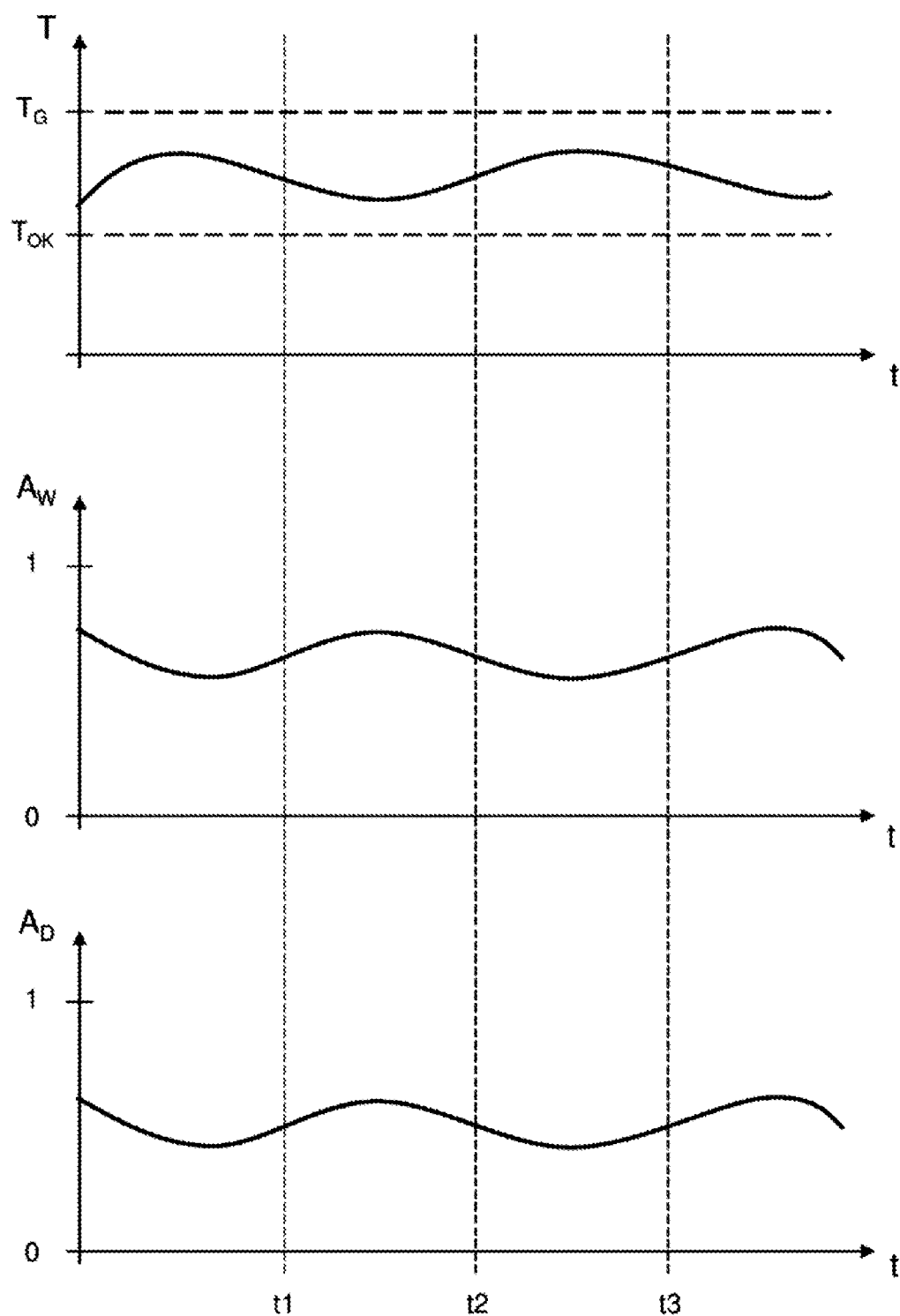
FIG. 3 shows various diagrams, each with a course of different variables with respect to time, for the purposes of illustrating a method according to a second exemplary embodiment, implemented on the vehicle drive from FIG. 1.

In the diagrams of FIG. 2, the following are plotted, in each case versus the time:
a) The temperatures T, measured continuously by means of the temperature sensor 29, of the exhaust gases in the exhaust-gas conduit 16 directly upstream of the inlet to the exhaust-gas aftertreatment device 20.
b) A degree of opening $A_W$ of the bypass exhaust-gas regulating device 18.

c) A degree of opening $A_D$ of the throttle flap 12.

The first exemplary method can thus be discussed on the basis of the diagrams of FIG. 2:

In full-load operation of the internal combustion engine 2, the temperature T increases ever further until, at the point in time t1, it reaches the upper critical temperature threshold value $T_G$, above which there is the risk of damage to the exhaust-gas aftertreatment device 20.

In the exemplary embodiment, as a result of the threshold value $T_G$ being reached (or overshot), the controller 32 in the engine controller 30 intervenes by reducing the degree of opening $A_W$ of the bypass exhaust-gas regulating device 18 and the degree of opening $A_D$ of the throttle flap 12.

This firstly has the result that, owing to the reduction of the degree of opening $A_W$ of the bypass exhaust-gas regulating device 18, a greater fraction of the exhaust gases is conducted via the high-pressure turbine 26 than is actually required for this operating state of the internal combustion engine 2. The entirety of the exhaust gases at the inlet into the exhaust-gas aftertreatment device 20 thus loses more enthalpy and thus temperature than before.

Consequently, the measured temperature T firstly falls below the upper threshold value $T_G$, and later decreases further as far as a lower threshold value $T_{OK}$.

At the same time, however, an increased charge pressure would build up, which, owing to the influence on the behavior of the compressor of the exhaust-gas turbocharger, has an undesired influence on the power of the internal combustion engine.

To compensate for or avoid this effect of the reduction of the degree of opening $A_W$, at the same time as this reduction the degree of opening $A_D$ of the throttle flap 12 is also correspondingly reduced proceeding from the time t1.

If, at the time t2, the lower threshold value $T_{OK}$ of the measured temperature T—that is to say a non-critical temperature range—has been reached, the degrees of opening $A_W$ and $A_D$ are set again to the value actually intended for this operating state of the internal combustion engine 2.

If this has the result that, after a further time interval (for example at the time t3), the temperature T reaches or overshoots the upper threshold value $T_G$ again, then the same measures according to the present disclosure are implemented again.

FIG. 3 illustrates the same diagrams as FIG. 2, but for a different, second exemplary method. The second exemplary method differs from the first as per FIG. 2 in particular by the fact that the temperature T is regulated not by a digital, on/off implementation of the present disclosure, but by way of a continuous and gradual adaptation of the degrees of opening $A_W$ and $A_D$.

This makes it possible in particular for the temperature T to be regulated in a narrow temperature band, which can furthermore be further removed from the critical value $T_G$. It can thus be ensured that the temperature-critical components exhibit a longer service life.

LIST OF REFERENCE DESIGNATIONS

1 Vehicle drive
2 Internal combustion engine
4 Intake system
6 Exhaust-gas system
8 Fresh-air conduit
10 Charge-air cooler
12 Air regulating device, e.g. throttle flap
14 Air manifold
16 Exhaust-gas conduit
18 Bypass exhaust-gas regulating device, e.g. wastegate valve
20 Exhaust-gas aftertreatment arrangement
22 Exhaust-gas turbocharger
24 High-pressure EGR line
26 High-pressure exhaust-gas turbine
28 High-pressure turbine bypass
29 Temperature sensor
30 Engine controller
32 controller
t Points in time during an execution of the method
T Catalytic converter temperature
$T_G$ Upper, critical threshold value of the catalytic converter temperature
$T_{OK}$ Lower threshold value of the catalytic converter temperature
$A_W$ Degree of opening of the bypass exhaust-gas regulating device
$A_D$ Degree of opening of the air control device

The invention claimed is:

1. A method for controlling an internal combustion engine, the method comprising:
   determining a catalytic converter temperature;
   comparing the catalytic converter temperature with an upper temperature threshold value;
   identifying an overshooting of the threshold value in the comparison;
   reducing a fraction of the exhaust gases of the internal combustion engine that are conducted through a turbine bypass of an exhaust-gas turbocharger of the internal combustion engine in response to identifying the overshooting; and
   reducing a supply of fresh air to the cylinders of the internal combustion engine in response to identifying the overshooting.

2. The method according to claim 1, comprising:
   reducing the supply of fresh air to an extent that is dependent on an extent of the reduction of the fraction of the exhaust gas in the turbine bypass.

3. The method according to claim 1, comprising:
   ending both the reducing of the fraction of the exhaust gasses that are conducted through the turbine bypass and the reducing of the supply of fresh air to the cylinders in response to undershooting a lower temperature threshold value of the catalytic converter temperature.

4. The method according to claim 1, comprising:
   increasing both the reducing of the fraction of the exhaust gasses that are conducted through the turbine bypass and the reducing of the supply of fresh air to the cylinders in response to overshooting the upper temperature threshold value by a greater degree.

5. The method according to claim 1, comprising:
   determining the catalytic converter temperature at least two times; and
   determining a temperature gradient and/or a temperature prediction from the catalytic converter temperature determined at least two times.

6. The method according to claim 1, comprising:
   determining a temperature gradient and/or a determined temperature prediction;
   determining, based on the temperature gradient and/or the determined temperature prediction, that an overshoot of the threshold value is to be expected and/or is unavoidable;

reducing the fraction of the exhaust gases that are conducted through the turbine bypass in response to determining that the overshoot is to be expected and/or is unavoidable; and reducing the supply of fresh air to the cylinders in response to determining that the overshoot is to be expected and/or is unavoidable.

7. The method according to claim 1,
wherein reducing the fraction of the exhaust gases that are conducted through the turbine bypass comprises reducing a degree of opening of a bypass exhaust-gas regulating device.

8. The method according to claim 1,
wherein reducing the supply of fresh air to the cylinders comprises reducing a degree of opening of an air regulating device of an intake system of the internal combustion engine.

9. The method according to claim 1, comprising:
reducing both the reducing of the fraction of the exhaust gasses that are conducted through the turbine bypass and the reducing of the supply of fresh air to the cylinders in response to an operating state of the internal combustion engine.

10. The method according to claim 1, comprising:
ending both the reducing of the fraction of the exhaust gasses that are conducted through the turbine bypass and the reducing of the supply of fresh air to the cylinders in response to an operating state of the internal combustion engine.

11. An engine controller of an internal combustion engine, wherein the engine controller is configured to:
determine a catalytic converter temperature;
compare the catalytic converter temperature with an upper temperature threshold value;
identify an overshooting of the threshold value in the comparison;
reduce a fraction of the exhaust gases of the internal combustion engine that are conducted through a turbine bypass of an exhaust-gas turbocharger of the internal combustion engine in response to identifying the overshooting; and
reduce a supply of fresh air to the cylinders of the internal combustion engine in response to identifying the overshooting.

12. The engine controller according to claim 11, wherein the engine controller is configured to:
reduce the supply of fresh air to an extent that is dependent on an extent of the reduction of the fraction of the exhaust gas in the turbine bypass.

13. The engine controller according to claim 11, wherein the engine controller is configured to:
end both the reduction of the fraction of the exhaust gasses that are conducted through the turbine bypass and the reduction of the supply of fresh air to the cylinders in response to the catalytic converter temperature undershooting a lower temperature threshold value of the catalytic converter temperature.

14. The engine controller according to claim 11, wherein the engine controller is configured to:
increase both the reduction of the fraction of the exhaust gasses that are conducted through the turbine bypass and the reduction of the supply of fresh air to the cylinders in response to the catalytic converter temperature overshooting the upper temperature threshold value.

15. The engine controller according to claim 11, wherein the engine controller is configured to:
determine the catalytic converter temperature at least two times; and
determine a temperature gradient and/or a temperature prediction from the catalytic converter temperature determined at least two times.

16. The engine controller according to claim 11, wherein the engine controller is configured to:
determine a temperature gradient and/or a determined temperature prediction;
determine, based on the temperature gradient and/or the determined temperature prediction, that an overshoot of the threshold value is to be expected and/or is unavoidable;
reduce the fraction of the exhaust gases that are conducted through the turbine bypass in response to determining that the overshoot is to be expected and/or is unavoidable; and
reduce the supply of fresh air to the cylinders in response to determining that the overshoot is to be expected and/or is unavoidable.

17. The engine controller according to claim 11, wherein the engine controller is configured to:
reduce the fraction of the exhaust gases that are conducted through the turbine bypass by reducing a degree of opening of a bypass exhaust-gas regulating device.

18. The engine controller according to claim 11, wherein the engine controller is configured to:
reduce the supply of fresh air to the cylinders by reducing a degree of opening of an air regulating device of an intake system of the internal combustion engine.

19. The engine controller according to claim 11, wherein the engine controller is configured to:
reduce or end both the reduction of the fraction of the exhaust gasses that are conducted through the turbine bypass and the reduction of the supply of fresh air to the cylinders in response to an operating state of the internal combustion engine.

20. A vehicle drive comprising:
an internal combustion engine;
an intake system with an air regulating device;
an exhaust-gas turbocharger with an exhaust-gas turbine and with an exhaust-gas turbine bypass that has a bypass exhaust-gas regulating device;
an exhaust-gas aftertreatment device with a temperature determining device; and
the controller according to claim 11.

\* \* \* \* \*